United States Patent [19]

Berkey et al.

[11] Patent Number: 5,104,434
[45] Date of Patent: Apr. 14, 1992

[54] METHOD OF MAKING FIBER OPTIC COUPLERS

[75] Inventors: George E. Berkey, Pine City; Mark T. Krowiak, Corning; Daniel P. Saunders, Horseheads, all of N.Y.

[73] Assignee: Corning Incorporated, Corning, N.Y.

[21] Appl. No.: 604,179

[22] Filed: Oct. 29, 1990

Related U.S. Application Data

[62] Division of Ser. No. 380,877, Jul. 17, 1989, Pat. No. 4,979,972.

[51] Int. Cl.⁵ .................... C03C 25/02; C03B 23/20
[52] U.S. Cl. ................................ 65/3.11; 65/4.2; 65/4.21; 65/4.3; 385/50
[58] Field of Search ............... 65/2, 3.11, 3.2, 4.2, 65/4.21, 4.3, 12, 109, 110, 157, 296, 374.15; 350/96.15; 385/50

[56] References Cited

U.S. PATENT DOCUMENTS

| | | | |
|---|---|---|---|
| 3,579,316 | 5/1971 | Dyott et al. | 65/4.2 |
| 4,291,940 | 9/1981 | Kawasaki et al. | 65/4.2 |
| 4,336,047 | 6/1982 | Pavlopoulos et al. | 65/3.31 |
| 4,377,403 | 3/1983 | McLandrich | 65/4.21 |
| 4,392,712 | 7/1983 | Ozeki | 350/96.15 |
| 4,426,215 | 1/1984 | Murphy | 65/4.2 |
| 4,439,221 | 3/1984 | Smyth et al. | 65/4.2 |
| 4,449,781 | 5/1984 | Lightstone et al. | 350/96.15 |
| 4,490,163 | 12/1984 | Jochem et al. | 65/4.21 |
| 4,591,372 | 5/1986 | Bricheno et al. | 65/4.2 |
| 4,704,151 | 11/1987 | Keck | 65/4.2 |
| 4,726,643 | 2/1988 | Imoto et al. | 350/96.21 |
| 4,750,926 | 6/1988 | Berkey | 65/2 |
| 4,773,924 | 9/1988 | Berkey | 65/4.2 |
| 4,799,949 | 1/1989 | Keck et al. | 65/4.21 |
| 4,902,323 | 2/1990 | Miller et al. | 65/4.21 |
| 4,902,324 | 2/1990 | Miller et al. | 65/4.21 |
| 4,906,068 | 3/1990 | Olson et al. | 350/96.15 |
| 4,915,467 | 4/1990 | Berkey | 350/96.15 |
| 4,925,269 | 5/1990 | Scrivener | 350/96.15 |
| 4,931,076 | 6/1990 | Berkey | 65/4.2 |
| 4,932,740 | 6/1990 | Berkey et al. | 350/96.15 |

FOREIGN PATENT DOCUMENTS

| | | |
|---|---|---|
| 56-126817 | 10/1981 | Japan . |
| 58-091403 | 5/1983 | Japan . |
| 59-195615 | 11/1984 | Japan . |
| 62-069206 | 3/1987 | Japan . |
| 63-163308 | 7/1988 | Japan . |
| 63-217313 | 9/1988 | Japan . |
| 1-021404 | 1/1989 | Japan . |
| 1-084928 | 3/1989 | Japan . |

OTHER PUBLICATIONS

Dyott et al., Polarization Holding Directional Couplers Using D Fiber, SPIE vol. 479, Fiber Optic Couplers, Connectors and Splice Technology, 1984, pp. 23-27.

Primary Examiner—Kenneth M. Schor
Assistant Examiner—John J. Bruckner
Attorney, Agent, or Firm—William J. Simmons, Jr.

[57] ABSTRACT

A fiber optic coupler is formed by providing a glass tube having a longitudinal aperture extending therethrough. Protective coating is removed from a region of a first optical fiber intermediate the ends thereof. Protective coating is removed from an end region of at least one other optical fiber. The coated portion of the first fiber is threaded through the tube until the uncoated region thereof is near the tube end. The size of the aperture is insufficient for simultaneously receiving the coated portions of the first and second fibers in side-by-side relationship at the coated portion of both. The uncoated region of the second fiber is placed adjacent that of the first fiber, and both uncoated regions are simultaneously fed into the tube aperture. After the threading operation has continued until the uncoated regions extend through the midregion of the tube, the midregion is heated to collapse it about the fibers, and the central portion of the midregion is drawn to reduce the diameter thereof over a predetermined length.

16 Claims, 3 Drawing Sheets

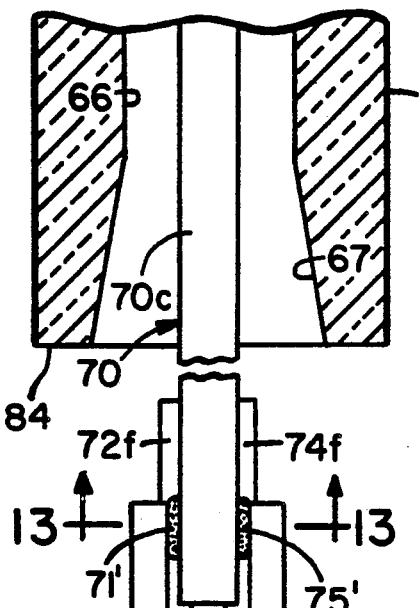
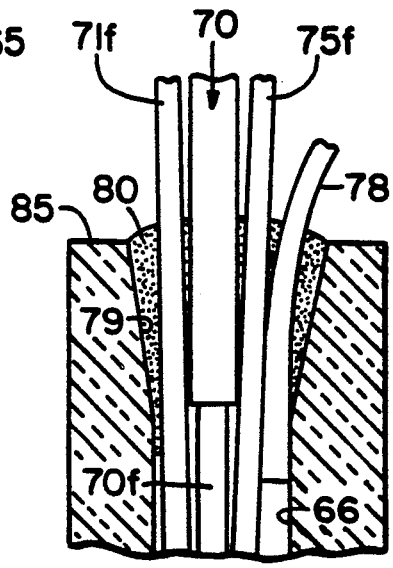
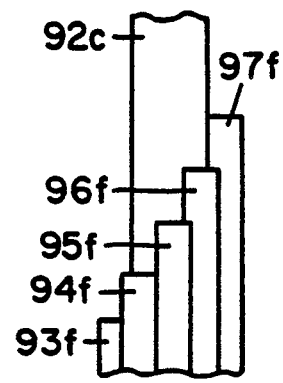
Fig. 16
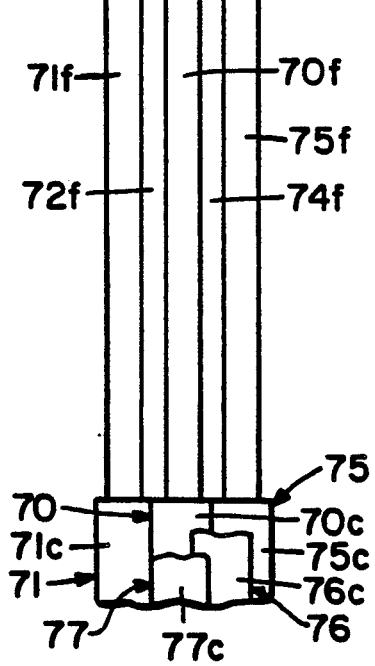
Fig. 12
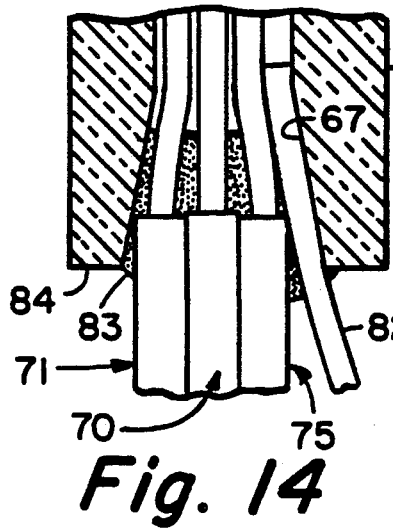
Fig. 14
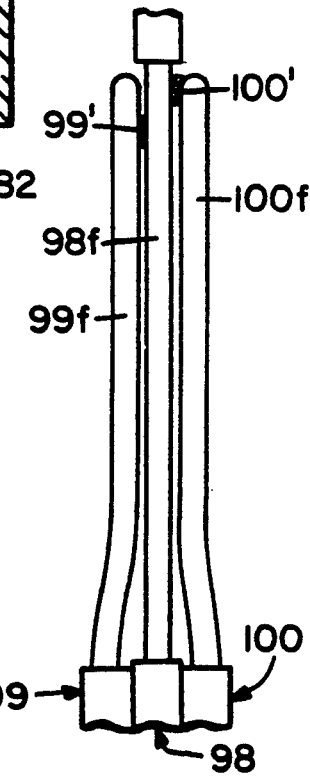
Fig. 17
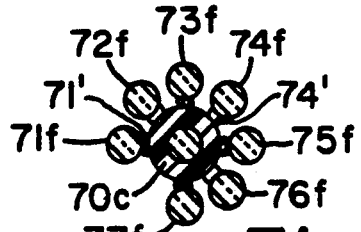
Fig. 15
Fig. 13

METHOD OF MAKING FIBER OPTIC COUPLERS

CROSS-REFERENCE TO RELATED APPLICATION

This application is a divisional of Ser. No. 380,877 filed Jul. 17, 1989 now U.S. Pat. No. 4,979,972.

This application is related to the following U.S. patent applications: Ser. No. 204,620 entitled "Method of Making an Economical Fiber Coupler" filed Jun. 9, 1988 now U.S. Pat. No. 4,931,076; Ser. No. 223,423 entitled "Method of Reproducibly Making Fiber Optic Coupler" filed Jul. 25, 1988 now U.S. Pat. No. 4,902,324; and Ser. No. 366,658 entitled "Method of Making Optical Devices" filed Jun. 15, 1989 now U.S. Pat. No. 5,031,300.

BACKGROUND OF THE INVENTION

The present invention relates to a method of making fiber optic couplers and is especially applicable to the fabrication of 1×N couplers which couple light from one optical fiber to N optical fibers, wherein N is a number equal to 2 or more. In addition to performing the coupling function, such devices can also be designed to perform such functions as wavelength division multiplexing, filtering and the like. In couplers wherein N is greater than two, a usual requirement is that the power be equally coupled from the input fiber to the N output fibers.

Methods of making multimode 1×N couplers are disclosed in U.S. Pat. No. 4,083,625 (Hudson) and in GB 2,023,874 A. Both of these documents teach methods that initially require fusing together and stretching the end portions of first and second optical fibers. In accordance with the Hudson patent, the common endface of the fused first and second fibers is fused to the endface of a third optical fiber. The British document teaches that a spheroidal lens is formed on the common end of the tapered first and second fibers, and a third fiber is positioned such that light radiating therefrom is coupled by the lens to the first and second fibers. These couplers are not suitable for single-mode fibers.

Single-mode couplers have been made by forming N×N couplers and severing and/or terminating N−1 fibers at one end of the device. For example, N×N single-mode optical fiber coupler can be formed in accordance with the teachings of European patent application No. 0302745, published 08 Feb. 89. A plurality of suitably prepared glass fibers, each having a core and cladding, are disposed within the longitudinal aperture of a glass capillary tube. Each fiber extends beyond at least one end of the tube to form a connection pigtail. The pigtails are provided with the same type and diameter of plastic coating as the optical fibers of the system in which the device is intended to be used so that the device can be easily integrated into the system. The midregion of the tube is heated and collapsed about the fibers, and the central portion of the collapsed midregion is stretched to reduce the diameter thereof. To form a 1×2 coupler, for example, two fibers are employed to initially form a 2×2 coupler, and one of the coupler pigtails or legs is terminated. In this type of coupler, the terminated leg is located external to the glass tube.

A requirement for certain coupler applications is that the terminated leg be such that the back reflection of optical power therefrom is substantially reduced. A common specification for such applications is that the reflected power be no more than −50 dB.

The preparation of the optical fibers for the above-described method has involved removing the coating from that portion of the fiber which is positioned at the midregion of the tube. The coated portions of the fibers are pulled through the tube aperture in order to position the uncoated region in the center of the tube prior to the tube collapse step. The coated portions of each fiber extend into the ends of the tube aperture to hold the fibers in proper alignment while the tube is collapsed thereon. The aperture must therefore be large enough to accept the coated portions of the fibers. When the aperture diameter is relatively large, whereby the tube must undergo an inordinate amount of collapse prior to the time that it engages the fibers therein, bubbles are more likely to form in the coupling region, and/or glass is more likely to flow between the fibers during the tube collapse step. These effects adversely affect optical characteristics such as attenuation and coupling ratio.

When N is large, it becomes more difficult to make 1×N couplers by severing and/or terminating pigtails extending from an N×N coupler. In such a coupler the input fiber must be centrally located with respect to the output fibers in order to obtain the best distribution of optical power to all output ports. Each of the N input ports of the initially formed N×N coupler would have to be measured in order to determine the centrally located port. A 16x16 coupler would require 256 measurements.

SUMMARY OF THE INVENTION

It is an object of the present invention to provide a method that overcomes the disadvantages of the prior art. Another object is to provide a method of making fiber optic couplers wherein capillary tube hole size is maintained sufficiently small that the tube collapse step is enhanced. A further object is to provide a method of making optical couplers, the optical properties of which closely conform to predetermined values. Another object is to provide a method of making 1×N fiber optic couplers wherein no external end terminations are needed for preventing the reflection of optical power from the terminated endface back into the fiber.

One aspect of the invention concerns a method of making a 1×N fiber optic coupler. The method is of the type wherein a plurality of optical fibers are disposed such that at least a part of each fiber extends into the aperture of a glass tube, at least that part of each fiber that is located in the tube midregion having no coating thereon. The tube midregion is collapsed onto the fibers, and the central portion of the midregion is stretched. In accordance with the invention, the step of disposing is characterized as follows. There is provided a first optical fiber having a protective coating thereon except for an uncoated section remote from the ends thereof. There is further provided at least one additional optical fiber having a protective coating thereon except for an uncoated section at one end thereof. The uncoated sections of the first and the at least one fibers are positioned within the tube midregion.

The step of providing at least one additional optical fiber may comprise providing a fiber having an uncoated section at one end thereof, the uncoated section having a rounded end. The end region of the uncoated section may be tapered to a smaller diameter than the remainder of the uncoated section. The diameter of the spherically-shaped end is preferably no greater than the diameter of the non-tapered diameter of the fiber, whereby the diameter of the tube bore can be made relatively small, thereby enhancing the step of collapsing the tube.

The spherically-shaped end may be formed by removing coating from the end of a coated fiber to form an uncoated end region, heating the uncoated end region remote from the end thereof and pulling on opposite sides of the heated region to sever the end. This process leaves on the fiber an uncoated tapered end region. The end of the tapered region is heated to lower the viscosity of the material thereof by an amount sufficient to cause the material to recede back along the fiber and form a rounded endface. The reflectance of the rounded endface can be monitored during the formation thereof. If such monitoring is performed, the step of heating the end of the tapered region is continued until the reflectance is reduced to a predetermined value.

The step of positioning may comprise positioning the uncoated section of the additional fiber adjacent the uncoated section of the first fiber, and simultaneously moving the uncoated sections into the tube. To facilitate this step, the uncoated section of the additional fiber can be attached to the first fiber. The point of attachment may be the coating or the uncoated section of the first fiber.

In one embodiment, the at least one additional optical fiber comprises a plurality of fibers, each having a protective coating thereon except for an uncoated section at one end thereof. The step of positioning may comprise positioning the uncoated sections of the plurality of fibers adjacent the uncoated section of the first fiber such that the junction between the coated and uncoated sections of the plurality of fibers is substantially aligned with a junction between a coated and uncoated section of the first fiber. The uncoated sections are simultaneously moved into the tube. It may be advantageous, especially when N is large, to attach the uncoated sections of the plurality of fibers to the first fiber. The following precaution can be taken to prevent the undue enlargement in the cross-section of the fibers when the plurality of fibers are glued to the first fiber. At least one of the plurality of fibers is attached to the first fiber at a longitudinal location along the first fiber that is different from the point of attachment of at least one other of the plurality of fibers.

Prior to collapsing the tube, a quantity of glue can be deposited at both ends of the tube aperture to secure to the tube those portions of the first fiber and the plurality of fibers which extend from the ends of the tube. Any part of an uncoated portion of the plurality of fibers which extends beyond the glue is preferably severed.

It is convenient to support the tube in a vertical orientation. The first fiber is threaded through the aperture until the uncoated section thereof lies below the tube, and the top portion of the first fiber which extends from the top of the tube is restrained. The uncoated section of the additional fiber is positioned adjacent the uncoated section of the first fiber. The top portion of the first fiber is pulled upwardly to position the uncoated section thereof in the aperture. The uncoated section of the at least one additional fiber is simultaneously moved into the aperture.

Another aspect of the invention concerns the resultant coupler which comprises an elongated glass body having a solid midregion and first and second opposite end portions which respectively extend from the midregion to the first and second ends of the body. First and second longitudinal apertures respectively extend from the first and second ends of the body to the midregion thereof. A first glass optical fiber extends through the body and beyond the first and second ends thereof. Those portions of the first fiber extending from the body have protective coating thereon. One end of at least a second glass optical fiber extends beyond the first end of the body, the second end of the second fiber terminating at the second end portion of the body. That portion of the second fiber at the second end of the body is uncoated. The central portion of the midregion of the body has a diameter smaller than the diameter of the remainder thereof. The cores of the optical fibers are closer together in the central portion of the midregion than in the remainder of the body so that optical signals can be coupled from the core of one of the fibers to the core of another of the fibers. Means in the first and second apertures seals to the body any fibers extending therefrom.

In one embodiment, the second end of the second fiber terminates within the second aperture. The end of the second fiber which terminates within the second aperture can have a spherically-shaped end, the diameter of which is smaller than the diameter of that section of the second fiber that is located in the first aperture. The spherically-shaped end is capable of reflecting back into the second fiber less than −50 dB of the power that propagates through the fiber and impinges thereon.

In an embodiment wherein $N>2$, the second ends of the plurality of fibers at the second end of the body terminate flush with the sealing means.

BRIEF DESCRIPTION OF THE DRAWINGS

FIG. 12 is a cross-sectional view illustrating a further embodiment of the invention.

FIG. 13 is a cross-sectional view taken along lines 13—13 of FIG. 12.

FIG. 14 is a cross-sectional view of a capillary tube after the uncoated fiber sections of FIG. 12 and 13 have been positioned therein.

FIG. 15 is a cross-sectional view which illustrates an alternative fiber positioning arrangement.

FIG. 16 is a side elevational view illustrating an alternative method of attaching fiber sections to a fiber coating.

FIG. 17 is a side elevational view illustrating the attachment of fiber sections to a central fiber section.

For the sake of clarity some fibers are broken away in FIG. 12 and only the central fiber and two diametrically opposed fibers are illustrated in FIG. 14.

DESCRIPTION OF THE PREFERRED EMBODIMENTS

The drawings are not intended to indicate scale or relative proportions of the elements shown therein.

Figure 1:
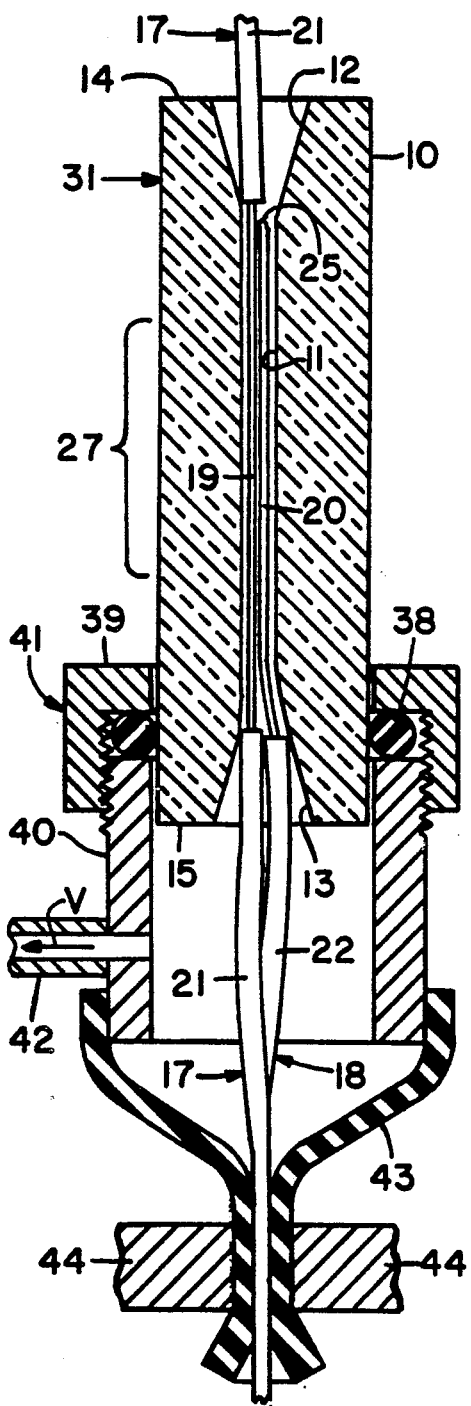
FIG. 1 is a cross-sectional view of a capillary tube after optical fibers have been inserted therein.

A first embodiment pertains to an improved method of making 1×2 fiber optic couplers. This method employs a tube 10 (FIG. 1) having a longitudinal bore or aperture 11. Tapered apertures 12 and 13 form funnel-like entrances to aperture 11 at end surfaces 14 and 15, respectively. The softening point temperature of tube 10 should be lower than that of the fibers that are to be inserted therein. Suitable tube compositions are $SiO_2$ doped with 1 to 25 wt. % $B_2O_3$ and $SiO_2$ doped with 0.1 to approximately 2.5 wt. % fluorine. Glasses comprising silica and combinations of these dopants can also be employed. Tube 10 can be formed by depositing glass particles on a cylindrical mandrel to form a porous, cylindrically-shaped preform. The mandrel is removed, and the porous preform is dried and consolidated to form a tubular glass body which is heated and redrawn to reduce its diameter. Apertures of non-circular cross-section can be formed in the tube by shrinking the tube onto a carbon mandrel of desired cross-section and then burning out the mandrel and stretching the tube to decrease its diameter. A short section of tube having tapered apertures 12 and 13 can be formed by attaching a capillary tube to a source of air pressure, and while rotating the tube, directing a flame onto the tube at spaced intervals. The pressure within the tube forms a bubble at each region softened by the flame. The tube is scored and severed at the center of each bubble.

Two lengths 17 and 18 of coated optical fiber are severed from a reel of fiber. Coated fibers 17 and 18 comprise glass fibers 19 and 20, respectively, each comprising a core and a cladding and each having a protective coating 21 and 22, respectively. A portion of the coating intermediate the ends of coated fiber 17 is removed for a distance slightly longer than the length of aperture 11 but shorter than the length of tube 10.

Figure 2:
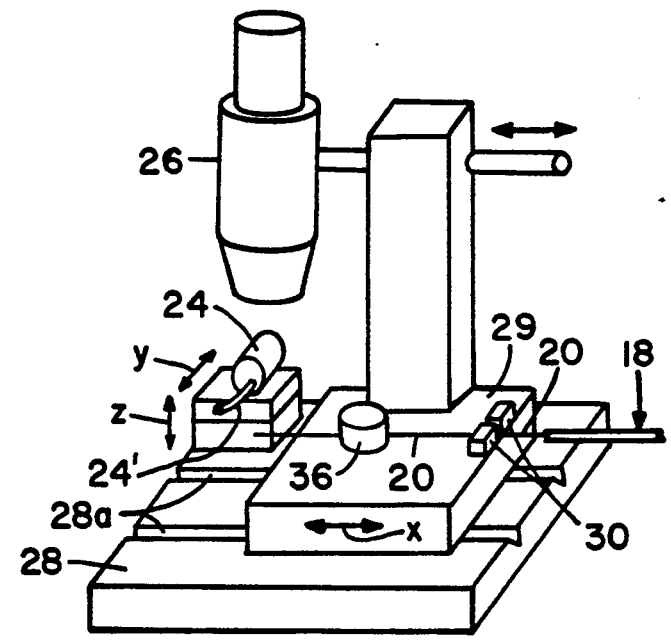
FIG. 2 is an oblique view of an apparatus for forming an antireflection termination on the end of an optical fiber.

The apparatus shown in FIG. 2 can be employed to provide a low reflectance termination which is required for many coupler applications. Table 29 is slidable in the x direction along grooves 28a of base 28. An oxygen-acetylene torch 24 is mounted on base member 28 so that it can be moved in the y and z directions. The position of torch 24 is initially adjusted in the z direction so nozzle 24' lies approximately in the plane of the surface of table 29. Two closely spaced guides 30 are located at one end of table 29 in alignment with a fiber retaining groove (not shown). A fiber is held in the groove by retainer disk 36. Microscope 26 is mounted on table 29 in such a location that the end of a fiber extending beyond table 29 appears in its field of view.

Figure 4:
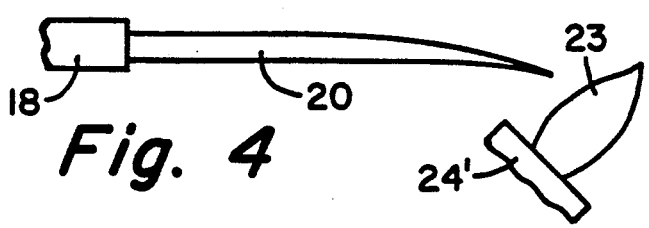
FIGS. 4 and 5 are schematic illustrations of two steps during the operation of the apparatus of FIG. 2.

The coating is removed from the end of coated fiber 18. An oxygen-acetylene flame is directed at the uncoated fiber a short distance from the end thereof, and the end of the fiber is pulled until it becomes severed from the remainder of the fiber. As shown in FIG. 4, the fiber now has a tapered end.

Figure 3:
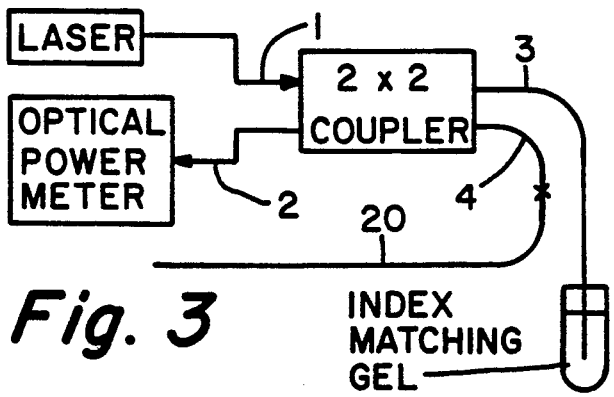
FIG. 3 is a block diagram illustration of a system for measuring the back-reflectance of an optical fiber.

The end of coated fiber 20 remote from the tapered end is connected to the apparatus of FIG. 3 to monitor the reflectance from the tapered end. The system of FIG. 3 comprises a 2×2 3 dB coupler having ports 1–4. A laser is connected to port 1, and an optical power meter is connected to port 2. The end of the optical fiber that comprises port 3 is cleaved, and that end is immersed in a tube of index matching gel to prevent the reflection of light from the immersed end back through the coupler to the power meter. The end of fiber 20 remote from the tapered end is fusion spliced to port 4. Laser light which reflects from the tapered end of fiber 20 (and from the rounded end formed by the FIG. 2 apparatus passes through the coupler to the power meter.

Figure 5:
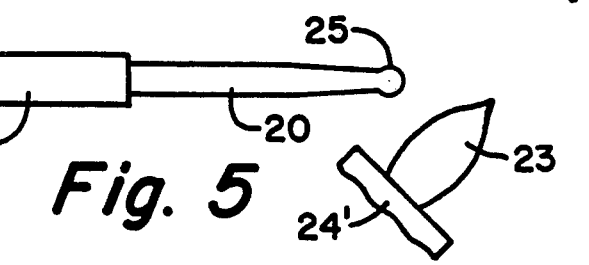

Fiber 20 is placed between guides 30 such that it lies in the groove in the surface of table 29 with its tapered end extending beyond the table toward nozzle 24'. The end of the fiber is positioned in the center of the microscope field. With torch 24 turned off and table 29 moved to the left of base 28 (as viewed in FIG. 2), the position of torch 24 is adjusted in the y direction such that the end of the fiber is adjacent nozzle 24' (FIG. 4). Table 29 is moved to the right, and the torch is ignited. Only the bright, central portion 23 of the flame is illustrated in FIGS. 4 and 5. Table 29 is moved slowly to the left, whereby the tapered tip of fiber 20 is heated by the flame. The tapered end is provided with a low reflectance termination by heating it to lower the viscosity of the material thereof by an amount sufficient to cause the material to recede back along the fiber and form a rounded endface 25 (FIG. 5), the final diameter of which is about equal to or slightly smaller than the original uncoated fiber diameter. The heating is continued until the power of the laser light that reflects from the rounded end and propagates back through the fiber toward the opposite end is less than a predetermined value. A current specification for the reflected power is −50 dB.

Continued heating of the rounded endface would cause the glass from the tapered end to continue to recede, thereby increasing the diameter of the rounded end with essentially no improvement in reflection reduction properties. If the diameter of the rounded end were to become larger than that of the fiber, the tube aperture 11 would have to be made large enough to accommodate it. Therefore, it is preferred that the step of heating the tapered end be terminated before the diameter of the rounded endface becomes larger than the initial diameter of the uncoated fiber.

If the uncoated portion of fiber 20 is too short after the antireflection termination has been formed, an additional length of coating is removed, whereby the total uncoated section of optical fiber 20 is sufficiently long that it extends beyond the tube midregion 27 when the end of coating 22 is situated in tapered aperture 13. After the fiber insertion process, fiber end 25 preferably does not extend beyond tube end 14; it may be located within tapered aperture 12 or in the end of longitudinal aperture 11.

The fibers are wiped to eliminate residual material. A small amount of ethyl alcohol may be squirted into the tube to temporarily lubricate the fibers during insertion thereof; it then readily evaporates. Coated fiber 17 is inserted through aperture 11 until the uncoated section thereof is situated just beyond tube end 15. The uncoated portion of coated fiber 18 is held adjacent the uncoated portion of coated fiber 17, and both coated fibers are moved together toward tube end 14 until the coating end regions, which are adjacent one another, become wedged in tapered aperture 13. The uncoated portion of coated fiber 17 is then disposed intermediate end surfaces 14 and 15, the uncoated portion of coated fiber 17 preferably being centered within aperture 11. End 25 of fiber 18 is located between midregion 27 and end 14 of tube 10.

The stripped portion of fiber 17 could initially be centered in aperture 11, and the stripped end portion of fiber 18 could thereafter be inserted into the aperture. However, the fiber insertion process is facilitated by simultaneously inserting both stripped portions.

Figure 6:
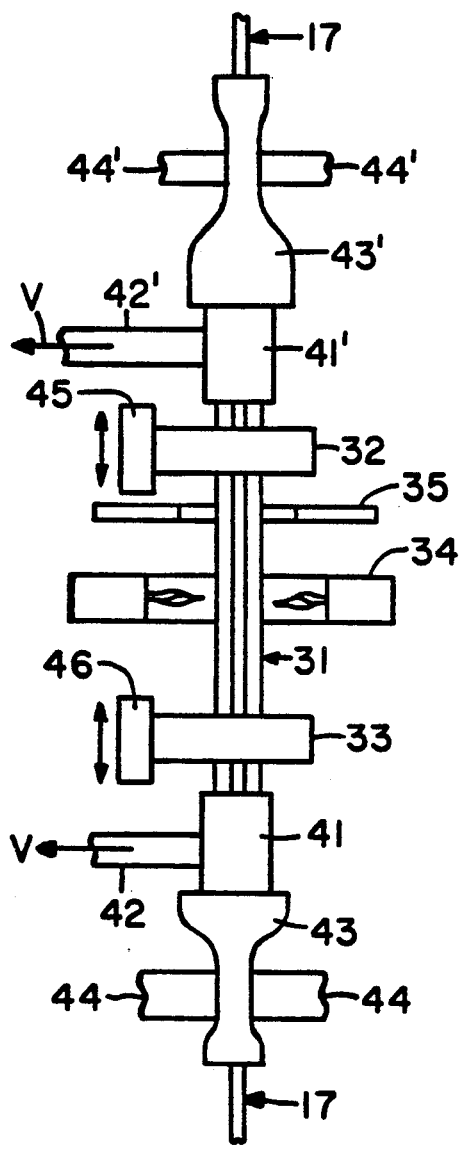
FIG. 6 is a schematic illustration of an apparatus for collapsing a capillary tube and drawing the midregion thereof.

Apparatus for collapsing and stretching the resultant preform 31 is shown in FIG. 6. Chucks 32 and 33, which secure preform 31 in this apparatus, are mounted on motor controlled stages 45 and 46, respectively, which are preferably controlled by a computer. Heat shield 35 protects the apparatus located above ring burner 34. Preform 31 is inserted through ring burner 34, is clamped to the draw chucks, and vacuum attachments 41 and 41' are attached to the ends thereof. Vacuum attachment 41, which is shown in cross-section in FIG. 1, may comprise a tube 40, a collar 39 threaded thereon, and an O-ring 38 disposed between the collar and tube. After vacuum attachment 41 is slid over the end of tube 10, collar 39 is tightened, thereby compressing O-ring 38 against the tube. Vacuum line 42 is connected to tube 40. One end of a length of thin rubber tubing 43 is attached to that end of vacuum attachment 41 that is opposite preform 31; the remaining end of the tubing extends between clamp jaws 44. Upper vacuum attachment 41' is similarly associated with line 42', tubing 43' and clamp jaws 44'. The coated portions of the fibers extend from tubing 43 and 43'.

Tube 10 can be secured by chucks 32 and 33 prior to the fiber insertion step. While tube 10 is supported vertically by the chucks, the fibers are inserted as described above. The fibers extending from both ends of the tube are threaded through their respective vacuum apparatus, and vacuum attachments 41 and 41' are connected to the tube.

Vacuum is applied to the lower portion of coupler preform 31 by clamping jaws 44 on tubing 43 while the upper vacuum attachment is vented to air or connected to a source of inert gas or a liquid cleaning agent. This washes from aperture 11 any loose debris which has accumulated therein during the fiber insertion step. Jaws 44' are then clamped against tubing 43' to apply vacuum to the upper portion of preform 31.

Figure 8:
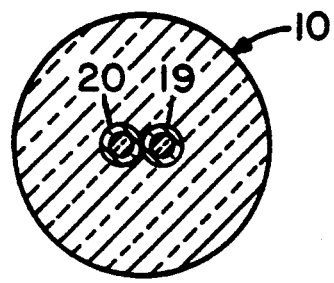
FIG. 8 is a cross-sectional view through the solid midregion of FIG. 7 along lines 8—8.
Figure 7:
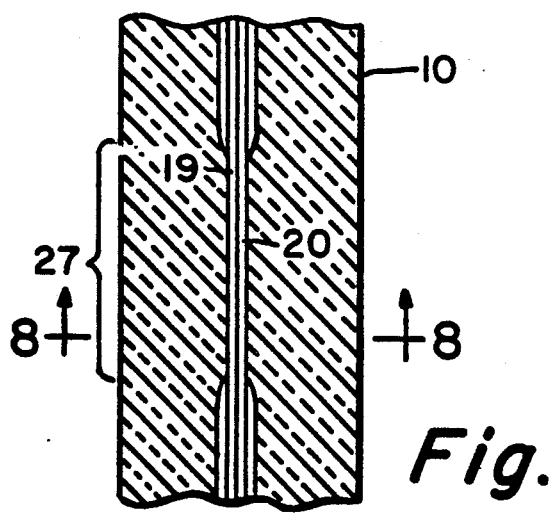
FIG. 7 is a partial cross-sectional view illustrating the collapse of the glass tube around the fibers to form a solid midregion.

The flame from ring burner 34 heats tube 10 for a short period of time, typically about 25 seconds, to increase the temperature of midregion 27 of the tube to the softening temperature thereof. With the assistance of the differential pressure on the tube, the matrix glass collapses onto fibers 19 and 20 and urges them into mutual contact. The tube matrix glass surrounds the fibers and fills the aperture to form a solid structure as shown in FIGS. 7 and 8. Midregion 27, the central portion of which forms the coupling region of the resultant coupler, becomes a solid region wherein substantially the entire lengths of fibers 19 and 20 are in mutual contact. The longitudinal length of the collapsed region depends upon the temperature and time duration of the flame, the thermal conductivity of the glass tube, and the amount of vacuum applied.

After the tube cools, the flame is reignited, and the center of the collapsed region is reheated to the softening point of the materials thereof. The flame duration for the stretch process, which depends upon the desired coupler characteristics, is usually between 10 and 20 seconds. The shorter heating period for the stretch step results in a stretched region that is shorter than the collapsed region. Stretching only the central portion of the collapsed midregion ensures that the coupling region of the fibers will be embedded in the matrix glass of the capillary tube. During this reheating step, the fibers are also heated since they are completely surrounded by the matrix glass of the capillary tube and are therefore in thermal contact therewith. After the collapsed tube is reheated, the flame is extinguished and stages 45 and 46 pull in opposite directions until the coupler length has been increased by a predetermined amount to bring the fiber cores closer together along a distance sufficient to accomplish a predetermined type of coupling. The diameter of midregion 27 is reduced as illustrated by region 51 of FIG. 9. The diameter of drawn down region 51 depends upon various fiber and operational parameters. The ratio of the drawn down diameter of region 51 to the starting diameter of midregion 27 (the draw down ratio) is determined by the optical characteristics of the particular device being made. It is well known that such draw down ratios are a function of the ratio of the signal split between the fibers, the refractive index difference between the tube and the fiber cladding, the outside diameter of the fiber cladding, the diameter of the fiber core, signal operating wavelength, cutoff wavelength, the tolerable excess loss, and the like. A preferred range of draw down ratios is between about ½ to 1/20; however, couplers can be made having draw down ratios outside this range.

The amount of stretching to which the coupler preform must be subjected to achieve a given type of coupler is initially determined by injecting light energy into the input fiber of a coupler preform and monitoring the output power at the output fibers during the stretch operation. The predetermined ratio of the dynamic output powers from the two fibers can be used as an interrupt to cause stages 45 and 46 to stop pulling the sample. After having determined the proper stretching distance to achieve predetermined coupling characteristics, the apparatus can be programmed to move the stages that proper stretching distance during the fabrication of subsequent couplers that are to have said predetermined characteristics.

It is conventional practice to monitor output signals to control process steps in the manufacture of optical devices as evidenced by U.S. Pat. Nos. 4,392,712 and 4,726,643, U.K. Patent Application No. GB 2,183,866 A and International Publication No. WO 84/04822. Furthermore, computers are often employed to in feedback systems which automatically perform such monitor and control functions. A suitably programmed PDP 11-73 micro-computer can be utilized to perform these functions. The timing sequences that have been used in the fabrication of a particular type of coupler can be entered in a separate multiple command file that the computer recalls at run-time. The collapse and stretch steps that are required to make that particular coupler can be executed in succession by the computer on each coupler preform to reproducibly manufacture couplers. The process parameters that can be controlled by the computer to ensure coupler reproducibility are heating times and temperatures, flow rates of gases, and the rate at which the stages pull and stretch the coupler preform.

The coupling characteristics of a coupler change as a newly formed coupler cools down. If the feedback system stops the stretching operation when 50% of the input power is coupled to each output fiber at 1300 nm, the coupling ratio at 1300 nm will not be 50/50 after the coupler cools down. The coupler is therefore monitored at a wavelength that is longer than the desired operating wavelength. If, for example, the output signals are split 50/50 at some wavelength such as 1400 nm at the end of the stretching operation when the coupler is still hot, a 50/50 split may be obtained at a desired operating wavelength such as 1300 nm after the coupler cools to room temperature. A wavelength of 1400 nm would therefore be employed to monitor that coupler output during the stretching operation.

Figure 9:
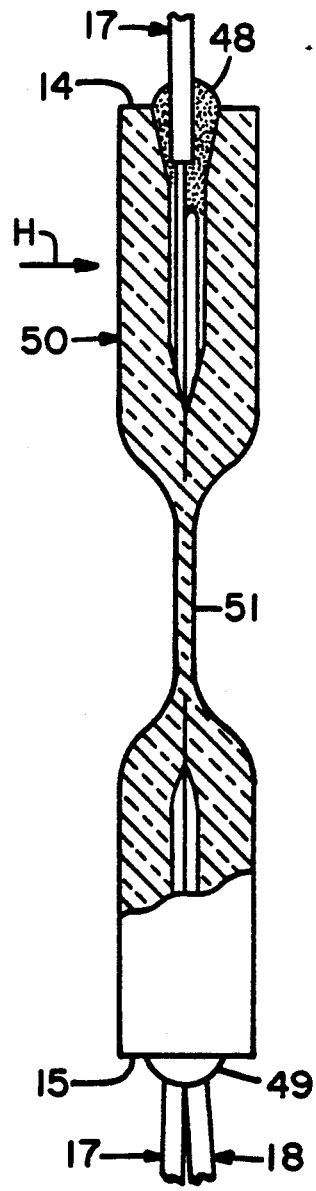
FIG. 9 is a partial cross-sectional illustration of a fiber optic coupler after it has been drawn down and sealed at its ends.

The vacuum lines are removed from the resultant coupler, and quantities 48 and 49 of glue are applied to the ends of the capillary tube (FIG. 9). Heat (arrow H) can be applied locally to the uncollapsed regions of the coupler to drive air from the aperture. The heat source is removed, and glue is drawn into the aperture and then cured. Glue 48 and 49 increases the pull strength of the fiber pigtails and produces a hermetic seal. The resultant fiber optic coupler 50 of FIG. 9 functions to couple a signal propagating in the sole optical fiber at end 14 to the two optical fibers extending from end 15. The coupler is then removed from the draw apparatus and can be packaged if additional stiffness is desired.

Various modifications can be made to the above-described embodiment. Midregion 27 could be heated by means of a conventional single-flame burner during the tube collapse and stretch steps, in which case the capillary tube is preferably rotated with respect to the flame to provide uniform heating. The burner may traverse midregion 27 during the tube collapse step and/or the stretch step. During the tube collapse step, the vacuum source could be attached to only one tube end, in which case a traversing burner should traverse the tube toward the evacuated end of the tube. During the step of drawing the preform midregion, stage 45 could be moved at a different velocity than stage 46 and in the same direction as stage 46. Furthermore, tube 10 can be disposed in any orientation including vertical and horizontal during the tube collapse and/or drawing operations.

If the collapse and stretch operations are performed in the same apparatus, it is preferred that tube 10 be allowed to cool prior to being reheated for the stretch step. This temporal separation of the two steps results in better process control and therefore better reproducibility. Couplers can also be made by an alternative embodiment wherein the steps of collapsing the tube onto the fibers and drawing or stretching the midregion of the tube are performed in a single heating operation. However, this modified embodiment can result in a reduction in hermeticity, and it can adversely affect manufacturing reproducibility.

Figure 10:
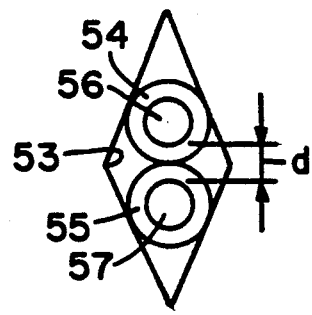
FIGS. 10 and 11 are schematic illustrations of aperture cross-sections having fibers disposed therein.

Heretofore, the size of the tube aperture has been dictated by the diameter of the coating, since the fiber coating extended through the tapered apertures at both ends of the coupler and extended a short distance into the central aperture 53 as shown in FIG. 10. In that prior method, the tube aperture was preferably shaped like a diamond or the like so that the coated fibers would be properly positioned by the aperture. Coatings 54 and 55 fit snugly into aperture 53; optical fibers 56 and 57 were therefore held in proper alignment at both ends of the tube. Since the aperture cross-section was sufficiently large to accommodate the fiber coating, the fibers were spaced from the aperture walls, and they were separated from each other by a distance, d, which is equal to twice the coating thickness.

Following is the sequence of events that is believed to occur during the collapse step, reference being made to the schematic illustration in FIG. 10. As the aperture cross-sectional dimensions decrease in size during the tube collapse step, the flattened wall surfaces of the aperture eventually come into contact with the fibers. As the aperture undergoes further collapse, the fibers are urged toward each other until mutual contact is achieved.

Since the fibers are initially separated by the distance d and since aperture 53 must undergo a considerable amount of collapse prior to the time that it contacts the fibers, the step of collapsing the tube onto the fibers may occur with less than optimal results, i.e. bubbles may form adjacent the fibers, or glass from the tube wall may enter the region between the fibers. The occurrence of these adverse effects can increase device loss and adversely affect process repeatability.

In accordance with the present invention, the tube collapse step is enhanced by employing a capillary tube having an aperture of reduced cross-sectional size. This improvement is made possible by that feature of the present method whereby the coated portion of only one fiber is passed through aperture 11, the remaining coated fiber or fibers being stripped at the ends thereof, and the stripped ends being inserted in the aperture in such a manner that they do not occupy any portion of the aperture that is occupied by coated fiber.

Figure 11:
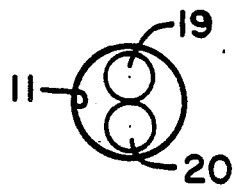

To illustrate the improvement of the invention, reference is made to FIG. 11. The absence of coatings in aperture 11 enables that aperture to be smaller in cross-section than aperture 53. Since the walls of aperture 11 undergo less inward movement before total collapse is achieved, and since fibers 19 and 20 must be moved a shorter distance to achieve mutual contact, the tube collapse step is more likely to be accomplished without matrix glass from the tube flowing between the fibers and without the deviation of the fibers from a linear path. Furthermore, because of the enhanced tube collapse step, the collapsed tube midregion is more likely to be free from air lines, bubbles, or the like. The process of the present invention should therefore more consistently produce couplers having low loss and predetermined coupling ratio. In addition, the use of pre-terminated fiber 20 allows the terminated end 25 to be located within glass tube 25. This eliminates the need to sever and terminate a leg after the coupler has been formed.

The embodiment illustrated in FIGS. 12-14 can be employed to make a 1×N coupler, wherein N>2. The capillary tube aperture should be slightly larger than the minimum diameter that will accept N fibers bundled together in a close packed array. Referring to FIGS. 12 and 13, tube 65 is supported in the vertical position. Coated optical fiber 70, the length of which is sufficient to provide pigtails which extend from both ends of tube 65, is cut from a reel. The mid-section of coated fiber 70 is marked to a length that is approximately 0.6 cm less than the length of tube 65, and a mechanical stripper is employed to remove the coating between the marks. After the uncoated section 70f is cleaned, a coated end 70c is fed through tube aperture 66 and is temporarily fixed when the bare fiber section 70f is located a convenient distance below the tube. A distance of about 30-40 cm has been found to be suitable. A plurality of fibers, equal in number to N−1, are cut to a length which is about ½ that of fiber 70. The coating is removed from one end of each of these fibers. The uncoated sections 71f-77f of these fibers are slightly longer than uncoated section 70f. To make a 1×8 coupler, for example, one-half of the uncoated sections 71f-77f can be about 7 cm longer than section 70f, and the remainder of the uncoated sections can be about 13 cm longer than section 70f. Each of the uncoated sections 71f-77f is cleaned prior to attaching it to section 70f. The end of fiber 71f is immersed in glue, and the excess glue is wiped off. Fiber 71f is then pressed against coating 70c, whereby it is adhered thereto by glue 71'. Uncoated sections 73f, 75f and 77f are similarly attached to coating 70c such that they are about equally spaced about coating 70c. The remaining, longer uncoated sections 72f, 74f and 76f are then similarly glued to coating 70c at a location slightly above the region where the first group of fiber sections were glued so that the ends of the coated portions 71c-77c are in axial alignment. The alignment of the ends of the coated portions 70c, 71c and 75c has been revealed by breaking away portions of fibers 76 and 77. In accordance with this method, a portion of the uncoated fiber sections 71f-77f are glued to a different longitudinal region of coating 70c than the remainder of those fiber sections. Gluing to the same longitudinal position would cause the cross-sectional dimension of the glued region to become inordinately large, whereby a larger tube aperture would become necessary.

After the N−1 fiber sections have been attached to coating 70c, coated fiber 70 is pulled through tube 65, thereby bringing the entire assembly of uncoated fiber sections 70f-77f into aperture 66, the ends of uncoated portions 71f-77f extending from end 84 of tube 10. The tube midregion can then be collapsed and the central portion thereof can be stretched as described above in conjunction with FIGS. 6-9. After the coupler has been formed, the protruding portions of sections 71f-77f are removed. Alternatively, in accordance with the aforementioned European patent application No. 0302745, the assembly could be placed in a suitable mounting device such as a tinner's clamp during the tube collapse step and mounted in a precision glass working lathe during the tube stretching operation. The ends of fiber sections 71f-77f protruding from end 85 can be severed, a dab of glue can be added to each end to add strength to the article, and the resultant coupler can be packaged if additional stiffness is desired.

An alternative procedure for holding the fiber sections during the tube collapse step is shown in FIG. 14. Hollow filament 78 is inserted into tapered aperture 79. Glue 80 is applied to tapered aperture 79 for a distance that is insufficient to reach the end of hollow filament 78. Glue 80 is cured to secure the fiber sections to the tube. The ends of fiber sections 71f-77f which extend from glue 80 are then broken off. Tube 10 is turned to the horizontal position. Hollow filament 82 is inserted into tapered aperture 67, and glue 83 is injected therein. Coated optical fibers 70-77 extending from end 84 of tube 65 are pulled taut, and glue 83 is cured. Tube 65 can then be collapsed and stretched.

Prior to collapsing the tube onto the fibers, the hollow filaments can be used to remove debris from the tube aperture. Hollow filaments 78 and 82 extend into vacuum attachments 41' and 41, respectively. Vacuum is applied to the lower portion of tube 65 for a time sufficient to wash aperture 64 by clamping jaws 44 on tubing 43. While the upper filament 78 is vented to air by leaving clamp jaws 44' open, the air wash pulls loose debris from aperture 64, through hollow filament 82, and into vacuum attachment 41. Jaws 44' are then clamped against tubing 43' to apply vacuum to the upper portion of tube 65.

In the described embodiment, light can be injected into the sole pigtail which extends from tube end 85, and the output from that end of the same fiber extending from tube end 83 can be monitored. Since only N−1 fibers are coupled to the input fiber, the other end of the input fiber is used as the Nth output fiber. When the optical power from the monitored fiber has decreased to 1/N of the input power, the tube stretching operation is terminated. If N fibers were coupled to the input fiber (rather than N−1 fibers as described above), the tube stretching operation would be continued until no power emanated from the other end of the input fiber. Thus, maximum power would have been coupled to the N output fibers.

Alternatively, an iterative process can be employed to determine the extent to which a particular coupler should be stretched. A plurality of coupler preforms are formed, each being stretched to a different length. The resultant couplers are measured off-line to determine the percentage of power that remains in the input fiber at the output end of the coupler. A determination is made of that coupler which provides an output that most nearly approximates 1/N of the input power. If necessary, another series of couplers can be made by stretching coupler preforms to about the same length as the first selected coupler. Once the proper stretching length has been determined, additional couplers are stretched to that proper length.

Optical power propagating in the input fiber is more likely to be evenly coupled to the output fibers if the output fibers are equally spaced about the input fiber. If three fibers are to be attached to the central fiber, the three fibers should be spaced by approximately 120°. When N becomes so large that the N−1 fibers cannot easily be spaced around the central fiber, the N−1 fibers should be arranged in two or more rows about the central fiber. For example, a 1×16 star coupler can be formed by attaching 6 fibers to the central fiber and spacing the remaining 9 fibers equally around the first row of fibers by gluing the remaining fibers to the first row.

In the above-described embodiment, the first four uncoated fiber sections 71f, 73f, 75f and 77f are equally spaced around central fiber section 70f. FIG. 13 shows that a gap exists between sections 71f and 77f after the remaining three sections are attached. A more even distribution of the sections 71f-77f could be obtained by spacing the first four sections as shown in FIG. 15. Uncoated fiber sections 87f and 88f abut one another, while equal spacings exist between fiber sections 88f, 89f, 90f and 87f. The remaining three fiber sections are then attached to coating 86c such that they lie in those spacings.

In the embodiment illustrated in FIG. 16, each of the uncoated end sections 93f-97f is a different length. Therefore, each section can be glued to the coating 92c of the centrally disposed fiber at a different longitudinal position, whereby the glue thickness has a minimal impact on the cross-sectional dimensions of the fiber array that must be pulled into the capillary tube aperture.

In the embodiment shown in FIG. 17, coated fiber 98 is similar to fiber 70 of FIG. 12, i.e. a length of coating material slightly shorter than that of the capillary tube is stripped from the mid-section thereof. Coated fibers 99 and 100 are stripped to form uncoated sections 99f and 100f, the lengths of which are slightly shorter than that of section 98f. A dab 99' of glue is applied to uncoated end section 99f, and that section is attached to uncoated section 98f near the top thereof. Uncoated section 100f is then glued to section 98f, glue 99' and 100' preferably being located at different longitudinal positions. If more than two uncoated fiber end portions are to be glued to the central fiber, the process continues with each uncoated section being glued to section 98f at a longitudinal position slightly different from the previous one. After all fiber end portions are glued, the uncoated sections are pulled into the tube as described above.

EXAMPLE 1

The following typifies those methods which were emloyed to form 1×2 fiber optic couplers providing 3 dB coupling at 1310 nm. A capillary tube 10 having a 3.8 cm length, 2.8 mm outside diameter, and 270 μm longitudinal aperture diameter is secured by chucks 32 and 33 of the apparatus of FIG. 6. The radii of the tapered apertures at the tube ends are almost half the tube radius. The composition of tube 10 is silica doped with about 6 wt. % B and about 1 wt. % fluorine.

Approximately 3.2 cm of coating is stripped from the central region of a 3 meter length of 125 μm diameter single-mode optical fiber 17 having a 250 μm diameter urethane acrylate coating. This fiber is threaded through the capillary tube and through the lower vacuum apparatus until the stripped region is located just below the tube. The coated fiber extending from the top of the tube is threaded through the upper vacuum attachment which is then secured to the capillary tube. Hose 43' is clamped to secure the fiber. A 6 cm long section of coating is removed from the end of a 1.5 meter length of fiber 18. An oxygen-acetylene flame is directed at the center of the stripped region of fiber, and the end of the fiber is pulled to form a tapered section which becomes severed to form a tapered end as shown in FIG. 4. The uncoated fiber is placed in the apparatus of FIG. 3, and the tapered end is moved toward the flame to fuse the end of the fiber and cause it to recede and form spherical end 25, the diameter of which is usually a few micrometers less than the 125 μm fiber diameter. The resultant length of uncoated fiber is about 2.9 cm. The uncoated sections of the fibers are wiped, and ethyl alcohol is squirted into the tube. The uncoated end of fiber 18 is threaded through the lower vacuum apparatus and is held adjacent the uncoated portion of fiber 17. Clamp 44' is released, and both fibers are moved upwardly until the uncoated regions are centered in aperture 11 and the coatings at the adjacent sections of fiber become wedged in tapered aperture 13. Clamps 44 and 44' are released to secure fibers 17 and 18. With the bottom of the tube connected to a vacuum source, nitrogen is supplied to the upper end thereof to wash the aperture contents. The upper end of fiber 17 is connected to a 1460 nm light source, and the lower end thereof is connected to a detector which forms a part of the system that controls the movement of chucks 32 and 33.

Tube 10 is collapsed onto fibers 17 and 18, and the midregion of the resultant structure is stretched to form a 3 dB coupler, the signal coupled to the detector being used to stop the stretching operation. The flame duration is 25 sec and 11 sec, respectively, for the collapse and stretch operations.

After the coupler had cooled, the vacuum lines are removed from the resultant coupler, and a drop of Dymax 305 adhesive is applied to each end of the capillary tube. After the adhesive is exposed to UV light for 30 seconds, the coupler is removed from the draw. The resultant devices couple approximately 50% of the signal propagating in that end of optical fiber 17 at end 14 to each of the two optical fibers 17 and 18 extending from end 15.

This process typically produced 3 dB couplers that operated at 1310 nm. After the process was tuned, the couplers which were made thereby exhibited a median excess device loss was about 0.15 dB, and a median coupling ratio of 50.8. The lowest measured loss was 0.02 dB.

EXAMPLE 2

The following typifies those methods which were employed to form 1×8 fiber optic couplers which were intended for operation at 1300 nm. Referring to FIGS. 12-14, a capillary tube 65 having a 9.5 cm length, 3 mm outside diameter, and 480 μm longitudinal aperture diameter is secured in a vertical orientation. The radii of the tapered apertures at the tube ends are almost half the tube radius. Tube 65 comprises a borosilicate glass containing about 8 wt % $B_2O_3$. Employed in this example is 125 μm outside diameter single-mode optical fiber having a coating diameter of 160 μm. The lengths of central fiber 70 and fibers 71-77 are 2 m and 1 m, respectively. An 8 cm long strip of coating is removed from the central region of fiber 70. The uncoated section 70f is cleaned, and the fiber is fed through tube 65 and is temporarily secured with the top of uncoated section 70f located about 30 cm below the tube. A 15 cm long strip of coating is removed from one end of four of the 1 m fibers, and a 21 cm long strip of coating is removed from one end of three of the 1 m fibers. Each uncoated section is cleaned.

The uncoated sections 71f-77f are wiped with a lintless cloth. The ends of uncoated fiber sections 71f, 73f, 75f and 77f are immersed in UV curable glue, and the excess is wiped off. These fiber sections are pressed against a coating 70c at circumferential positions whereby they are equally spaced around the periphery of the coating. Sections 71f-77f extend about 5 cm onto coating 70c. Uncoated sections 72f, 74f and 76f are immersed in UV curble glue, and the excess is removed. Each of these fiber sections is pressed against coating 70c above one of the gaps between the equally spaced fiber sections 71f, 73f, 75f and 77f. Sections 72f, 74f and 76f extend about 11 cm onto coating 70c and are thus glued to coating 70c at a location slightly above the region where the first group of fiber sections are glued. The ends of the coated portions 71c-77c are in axial alignment as shown in FIG. 12. Coated fiber 70 is pulled through tube 65, thereby bringing the entire assembly of uncoated fiber sections 70f-77f into aperture 66. Hollow filament 78 is inserted into tapered aperture 79, and UV curable glue 80 is applied in order to to secure the fiber sections to the tube. The ends of fiber sections 71f-77f are pulled free from coating 70c and are broken off at the surface of glue 80. Tube 10 is turned to the horizontal position, hollow filament 82 is inserted, and UV curable glue 83 is applied. Coated optical fibers 70-77 are pulled taut, and glue 83 is cured.

The assembly so formed is mounted in a tinner's clamp that was modified by cutting away the central portion and one end portion of the clamping region such that when the coupler assembly is mounted, the capillary tube midregion and one end surface 85 are exposed. A tube connected to a vacuum source is connected to capillary tube end 84 such that the coated optical fibers and hollow filament 82 are disposed inside the evacuated tube. In this manner, longitudinal aperture 66 is evacuated through hollow filament 82. Hollow filament 78 is inserted into a beaker of 30% ammonia solution. The ammonia solution is sucked into aperture 66 whereby the aperture and the outside surfaces of the optical fibers are cleansed for approximately 10 seconds. Hollow filament 78 is then removed from the beaker of cleansing solution. After as much of the liquid as possible is removed from aperture 66 by the vacuum source, a burner is directed at tube 65 for about 20 seconds to assist in drying out the interior thereof.

The midregion of tube 65 is then heated to the softening point of the borosilicate glass by an oxygen-hydrogen burner, thereby causing the glass to collapse around the optical fibers within the longitudinal aperture. The flame is then traversed through the tube midregion in the direction of the vacuum source so that as the material of the tube collapses about the optical fibers, residual matter within the longitudinal aperture is sucked out by the vacuum. In this manner a solid midregion is formed free of air lines or bubbles.

The assembly so formed is then removed from the modified tinner's clamp and place in a precision glass working lathe. The lathe is a Heathway glass working lathe having a computer controlled pull down or drawn down mechanism. The flame from an oxygen-hydrogen gas burner is then applied to a small portion of the solid midregion until the softening point of the materials is reached. The computer controlled pull down apparatus then stretches the heated section for an interval of approximately 0.5 second.

Thereafter, hollow filaments 78 and 82 are broken off, and UV curable glue is applied to the ends of the device to cover the resultant holes.

The lathe employed for stretching the couplers did not have the capability of employing output power for feedback purposes. Therefore, an iterative process was employed as described above. A series of couplers were made, each differing from the previous one in the amount of stretching to which it was subjected. The process was tuned such that the amount of power propagating from the output end of the input fiber was 12.5% of the total output. The percent of total power appearing at the remaining outputs of a specific coupler produced by this method were: 9.3%, 22%, 15.2%, 7.4%, 11.6%, 7.3% and 13.8%. The excess device loss was 0.38 dB.

We claim:

1. A method of making a fiber optic coupler comprising the steps of:
    providing a glass tube having first and second opposite end portions and a midregion, a longitudinal bore extending from a first end of said tube to a second end thereof, said longitudinal bore having a central region of substantially constant cross-sectional area size and first and second tapered regions between said central region and said first end and between said central region and said second end, respectively, said bore cross-sectional area being smaller than each of the cross-sectional areas of said first and second tapered regions at said tube ends, said midregion being within said central region,
    providing a first optical fiber including a core and cladding, said first fiber having a protective coating thereon except for an uncoated portion remote from the ends thereof,
    providing at least one additional optical fiber including a core and cladding, said additional fiber having a protective coating thereon except for an uncoated portion at one end thereof, said substantially constant cross-sectional area size being insufficient for simultaneously receiving said first optical fiber with coating and said at least one additional optical fiber with coating in side-by-side relationship at the coated portion of both, thereafter
    disposing the uncoated portion of said first fiber within said longitudinal bore, those portions of said first fiber which extend from said first and second ends of said tube having protective coating thereon,
    disposing the uncoated portion of said additional fiber within said longitudinal bore, that portion of said additional fiber which extends from said tube having protective coating thereon, the uncoated portions of said first and said additional fibers being situated in side-by-side relationship within said tube midregion, the junctions between coated and uncoated portions of said fibers at said first end portion of said tube being situated within said first tapered region,
    collapsing said tube midregion onto said fibers, and stretching at least a portion of said midregion, the two disposing steps effecting positioning of the uncoated portions of the fibers within said bore.

2. A method in accordance with claim 1 wherein the step of positioning comprises positioning the uncoated portion of said at least one additional fiber, and simultaneously moving all of the uncoated portions into said tube.

3. A method in accordance with claim 2 wherein the step of positioning comprises attaching the uncoated portion of said at least one additional fiber to said first fiber prior to the step of moving said uncoated portions into said tube.

4. A method in accordance with claim 3 wherein the step of attaching comprises attaching the end of the uncoated portion of said at least one additional fiber to the coating of said first fiber.

5. A method in accordance with claim 3 wherein the step of attaching comprises attaching the end of the uncoated portion of said at least one additional fiber to the uncoated portion of said first fiber.

6. A method in accordance with claim 1 wherein the step of providing at least one additional optical fiber comprises providing a plurality of fibers, each having a protective coating thereon except for an uncoated portion at one end thereof, and wherein the step of positioning comprises positioning the uncoated portions of said plurality of fibers adjacent the uncoated portion of said first fiber such that the junction between the coated and uncoated portions of said plurality of fibers is substantially aligned with a junction between a coated and uncoated portion of said first fiber, and simultaneously moving said uncoated portions into said tube.

7. A method in accordance with claim 6 wherein the step of positioning comprises attaching the uncoated portions of said plurality of fibers to said first fiber prior to the step of moving said uncoated portions into said tube.

8. A method in accordance with claim 7 wherein the step of positioning comprises attaching the uncoated portions of said plurality of fibers to said first fiber, at least one of said plurality of fibers being attached to said first fiber at a longitudinal location along said first fiber that is different from the point of attachment of at least one other of said plurality of fibers.

9. A method in accordance with claim 8 wherein the step of attaching comprises attaching the ends of the uncoated portions of said plurality of fibers to the coating of said first fiber.

10. A method in accordance with claim 8 wherein the step of attaching comprises attaching the ends of the uncoated portions of said plurality of fibers to the uncoated portion of said first fiber.

11. A method in accordance with claim 6 wherein the step of positioning further comprises depositing at both ends of said tube aperture a quantity of glue to secure to said tube those portions of said first fiber and said plurality of fibers which extend from the ends of said tube, and severing any part of an uncoated portion of said plurality of fibers which extends beyond said glue.

12. A method in accordance with claim 1 wherein the step of positioning comprises supporting said tube in a vertical orientation, threading said first fiber through said aperture until the uncoated portion thereof lies below said tube, restraining the top portion of said first fiber which extends from the top of said tube, positioning the uncoated portion of said at least one additional fiber adjacent the uncoated portion of said first position the uncoated portion thereof in the midregion of said bore, and simultaneously moving said uncoated portion of said at least one additional fiber into said tube.

13. A method in accordance with claim 1 wherein the step of providing at least one additional optical fiber comprises providing a fiber having an uncoated portion at one end thereof, and antireflection means at the end of said uncoated portion.

14. A method of making a fiber optic coupler comprising the steps of:
providing first and second glass optical fibers, each including a core and cladding and each having a protective coating thereon,
providing a glass tube having first and second opposite end portions and a midregion, a longitudinal bore extending from a first end of said tube to a second end thereof, said longitudinal bore having a central region of substantially constant cross-sectional size and first and second tapered regions between said central region and said first and second ends, respectively, said substantially constant cross-sectional area size being insufficient for simultaneously receiving said two coated fibers in side-by-side relationship at the coated portion of both and being of smaller cross-sectional size that the end of each of said tapered regions at each respective tube end and; said midregion being within said central region,
removing from a region of said first fiber that is remote from the ends thereof a section of coating that is longer than said constant diameter region of said bore but shorter than the length of said tube,
removing from an end region of said second fiber a section of coating that is sufficiently long that the uncoated portion of said second fiber extends through said tube midregion when said coating is disposed in one of the tapered regions of said bore, said removing providing an uncoated fiber end, thereafter,
disposing the uncoated portions of said first and second optical fibers with said longitudinal bore so that said uncoated portions extend throughout the length of said tube midregion, at least those portions of said fibers which extend from said tube ends having a protective coating thereon, the junctions between coated and uncoated portions of said fibers at said first end portion of said tube being situated with said first tapered region,
collapsing said tube midregion onto said fibers, and
stretching at least a portion of said midregion.

15. A method in accordance with claim 14 wherein the step of providing a tube comprises providing a tube having a bore of circular cross-section.

16. A method of making a fiber optic coupler comprising the steps of:
providing a glass tube having first and second opposite end portions and a midregion, a longitudinal bore thereof, said longitudinal bore having a central region of substantially constant cross-sectional area size and first and second tapered regions between said central region and said first and second ends, respectively, said bore cross-sectional area being smaller than each of the cross-sectional areas of said first and second tapered regions at said tube ends said midregion being within said central region,
providing first and second optical fibers, each including a core and cladding, said first fiber having a remote from the ends thereof, said second optical fiber having a protective coating thereon except for an uncoated portion at one end thereof, said substantially constant cross-sectional areas size being insufficient for simultaneously receiving the coated portions of said first and second optical fibers in side-by-side relationship at the coated portion of both,
inserting said first fiber into said first tube end to position the uncoated portion thereof within said longitudinal bore, those portions of said first fiber which extend from said first and second ends of said tube having protective coating thereon,
inserting the uncoated portion of said second fiber into said first tube end to position the uncoated portion thereof within said longitudinal bore, that portion of said second fiber which extends from said tube having protective coating thereon, the uncoated portions of said first and second fibers being situated in side-by-side relationship within said tube midregion, the junctions between coated and uncoated portions of said fibers at said first end portion of said tube being situated within said first tapered region,
collapsing said tube midregion onto said fibers, and
stretching at least a portion of said midregion.

* * * * *